(12) United States Patent
Wu et al.

(10) Patent No.: US 12,152,797 B2
(45) Date of Patent: Nov. 26, 2024

(54) CONTROL METHOD, AIR CONDITIONER, AND COMPUTER READABLE STORAGE MEDIUM

(71) Applicants: GD MIDEA HEATING & VENTILATING EQUIPMENT CO., LTD., Foshan (CN); MIDEA GROUP CO., LTD., Foshan (CN)

(72) Inventors: Kongxiang Wu, Foshan (CN); Yongfeng Xu, Foshan (CN); Hongwei Li, Foshan (CN); Ruhan Wang, Foshan (CN); Wei Wang, Foshan (CN)

(73) Assignees: GD MIDEA HEATING & VENTILATING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 406 days.

(21) Appl. No.: 17/425,287

(22) PCT Filed: Feb. 24, 2020

(86) PCT No.: PCT/CN2020/076374
§ 371 (c)(1),
(2) Date: Jul. 22, 2021

(87) PCT Pub. No.: WO2020/253257
PCT Pub. Date: Dec. 24, 2020

(65) Prior Publication Data
US 2022/0128258 A1    Apr. 28, 2022

(30) Foreign Application Priority Data
Jun. 20, 2019   (CN) .......................... 201910534764.1

(51) Int. Cl.
*F24F 11/65*    (2018.01)
*F24F 11/52*    (2018.01)
(Continued)

(52) U.S. Cl.
CPC .............. *F24F 11/65* (2018.01); *F24F 11/52* (2018.01); *G05B 15/02* (2013.01); *F24F 2130/10* (2018.01)

(58) Field of Classification Search
CPC ........ F24F 11/65; F24F 11/52; F24F 2130/10; F24F 11/58; F24F 11/77; F24F 11/64; F24F 11/89; G05B 15/02; Y02B 30/70
(Continued)

(56) References Cited

U.S. PATENT DOCUMENTS 11,001,231 B1 *   5/2021   Hedman ............... B60S 1/0844
2016/0091425 A1 *   3/2016   Kang ..................... G01N 21/55
62/89

(Continued)

FOREIGN PATENT DOCUMENTS

CN          104595223 A        5/2015
CN          105042777 A  *  11/2015  ................ F24F 1/06
(Continued)

OTHER PUBLICATIONS

ISR for PCT No. PCT/CN2020/076374.
(Continued)

*Primary Examiner* — Thomas C Lee
*Assistant Examiner* — Michael Tang (57) ABSTRACT

A control method, an air conditioner, and a computer readable storage medium. The control method is used for the air conditioner, and includes obtaining abnormal weather information of a region where the air conditioner is located, determining operating parameters of a draught fan of an outdoor unit in the air conditioner according to the abnormal weather information, and controlling the draught fan of the outdoor unit to operate according to the operating parameters.

14 Claims, 8 Drawing Sheets

(51) Int. Cl.
*G05B 15/02* (2006.01)
*F24F 130/10* (2018.01)

(58) Field of Classification Search
USPC .............................................. 700/276; 165/59
See application file for complete search history.

(56) References Cited

U.S. PATENT DOCUMENTS

2017/0284720 A1* 10/2017 Liu ....................... F25B 49/027
2020/0224917 A1* 7/2020 Allahar ................... F24F 11/61

FOREIGN PATENT DOCUMENTS

| CN | 106091242 | A | * | 11/2016 | ............. | F24F 11/30 |
|----|-----------|---|---|---------|--------------|------------|
| CN | 106949605 | A |   | 7/2017  |              |            |
| CN | 107143971 | A | * | 9/2017  |              |            |
| CN | 107166681 | A | * | 9/2017  |              |            |
| CN | 105042777 | B |   | 10/2017 |              |            |
| CN | 104864569 | B | * | 1/2018  | ............. | F24F 11/00 |
| CN | 108759013 | A |   | 11/2018 |              |            |
| CN | 109323426 | A |   | 2/2019  |              |            |
| CN | 109799843 | A | * | 5/2019  |              |            |
| CN | 110243060 | A |   | 9/2019  |              |            |
| DE | 102012207925 | A | * | 11/2013 |           |            |
| JP | S6454162  | A |   | 3/1989  |              |            |
| KR | 100765170 | B1|   | 10/2007 |              |            |

OTHER PUBLICATIONS

First OA for CN application 201910534764.1.
OA for IN application 202127036843.
Search Report for EP application 20825597.6.

* cited by examiner

CONTROL METHOD, AIR CONDITIONER, AND COMPUTER READABLE STORAGE MEDIUM

CROSS-REFERENCES TO RELATED APPLICATIONS

The present disclosure is a national phase application of International Application No. PCT/CN2020/076374, filed on Feb. 24, 2020, which claims priority of Chinese Patent Application No. "201910534764.1", filed on Jun. 20, 2019, the entireties of which are herein incorporated by reference.

FIELD

The present disclosure relates to the field of air conditioner control technology, and particular to a control method, an air conditioner and a computer readable storage medium.

BACKGROUND

At present, with the popularization of air conditioners, the reliability of air conditioners has received increasing attention from users, especially in the protection and use of air conditioners in an abnormal weather condition. The outdoor unit of the existing air conditioner usually only monitors the outdoor environment temperature to adjust the capacity, but the protection measure against the abnormal weather condition is insufficient, especially the capacity of dealing with the rain, snow, sand and dust weather. The poor control technology level easily results in malfunction or abnormality in the outdoor unit of the air conditioner, thus adversely affecting the reliability of the air conditioner and user satisfaction.

SUMMARY

Embodiments of the present disclosure are to provide a control method.

Another embodiment of the present disclosure is to provide an air conditioner.

Still another embodiment of the present disclosure is to provide a computer readable storage medium.

An embodiment a control method, used for an air conditioner, the control method includes: obtaining abnormal weather information of a region where the air conditioner is located; determining an operating parameter of a draught fan in an outdoor unit of the air conditioner according to the abnormal weather information; and controlling the draught fan in the outdoor unit to operate according to the operating parameter.

According to embodiments of the present disclosure, the control method obtains the abnormal weather information of the region where the air conditioner is located; determines the operating parameter of the draught fan in the outdoor unit of the air conditioner according to the abnormal weather information, thus determining the operating parameter, corresponding to the abnormal weather in the region, of the outdoor unit according to different abnormal weather conditions; and controls the draught fan in the outdoor unit to operate according to the operating parameter, and the draught fan in the outdoor unit can be operated according to the optimal operating parameter under different weather conditions, to reduce an adverse impact of weather on the operation of the outdoor unit, reduce a possibility of failure or abnormality of the outdoor unit caused by weather, and delay the aging of the outdoor unit, thus decreasing the cost for use. Besides, it is possible to realize smart control of the air conditioner, which is conducive to improving customer satisfaction. The abnormal weather includes but not limited to rain, snow, sand and dust, storm wind, hail, and other weather that may adversely affect the outdoor unit. The air conditioner may be preset with an operating parameter of the outdoor unit for different weather conditions, and the draught fan in the outdoor unit may be switched to operate according to the operating parameter corresponding to the current weather condition.

It would be understood that the outdoor unit of the air conditioner is usually disposed in an outdoor environment such as at roof or windowsill. Under different weather conditions, especially an abnormal weather condition, if there is no corresponding protective countermeasure, it is easy to cause failure or accelerated aging.

In addition, the control method provided in the above embodiment of the present disclosure may further have the following additional features.

In the above embodiment, said determining an operating parameter of a draught fan in an outdoor unit of the air conditioner according to the abnormal weather information includes: determining weather information within a first time period; determining at least one abnormal weather and an occurrence time period of each abnormal weather according to the weather information within the first time period; and adjusting the operating parameter of the draught fan in the outdoor unit according to the abnormal weather within the occurrence time period of each abnormal weather.

In this embodiment, the step of determining an operating parameter of a draught fan in an outdoor unit of the air conditioner according to the abnormal weather information is defined. The weather information within the first time period is determined, and the real-time weather information is determined to improve accuracy of the weather information, which is conducive to accurately controlling the outdoor unit. In one embodiment, the first time period may be set to be relative short, e.g., 30 or 60 seconds. At least one abnormal weather and the occurrence time period of each abnormal weather are determined according to the weather information within the first time period, to determine a target abnormal weather within the first time period and the occurrence time period of the target abnormal weather, thus providing a basis for determining the operating parameter corresponding to the abnormal weather of the draught fan in the outdoor unit. The operating parameter of the draught fan in the outdoor unit is adjusted according to the abnormal weather within the occurrence time period of each abnormal weather, and the draught fan in the outdoor unit can be operated according to the optimal operating parameter corresponding to the abnormal weather within the occurrence time period of each abnormal weather, thus reducing the adverse impact of the abnormal weather on the outdoor unit, reducing the possibility of failure of the outdoor unit caused by the abnormal weather, and delaying the aging of the outdoor unit.

It should emphasize that the weather information within the first time period may be obtained by real-time monitoring or from external information such as weather forecast. The real-time monitoring may be to monitor the real-time weather information by a sensor carried by the outdoor unit, or to monitor the real-time weather information by additionally-installed monitoring equipment.

In the above embodiment, said determining at least one abnormal weather according to the weather information within the first time period includes: determining a weather category of all weathers within the first time period; determining at least one air parameter of each weather category and a parameter range corresponding to each air parameter; and determining a weather corresponding to the weather category is the abnormal weather when there is at least one air parameter among all air parameters of the weather category being outside the parameter range.

In this embodiment, the step of determining at least one abnormal weather according to the weather information within the first time period is defined. The weather category of all weathers within the first time period is determined, and different weather categories in a current weather condition are obtained, which is more accurate than that using a single category of weather as a reference. It would be understood that multiple categories of weather may occur at the same time, for example rain mixed with snow, and storm wind and rain. At least one air parameter of each weather category and a parameter range corresponding to each air parameter are determined, to provide a basis for subsequent determination of the abnormal weather. In specific, the air parameter of each weather category and the parameter range corresponding to said air parameter may be set in advance. For example, the air parameter of rain is set as rainfall, and parameter range is set as 20 mm to 40 mm. When there is at least one air parameter among all air parameters of the weather category being outside the parameter range, it is determined that the weather corresponding to said weather category is the abnormal weather. In other words, the air parameters of each weather category are screened, and the weather category with an air parameter exceeding the corresponding parameter range is determined as the abnormal weather, and the outdoor unit is controlled to switch to operate according to the operating parameter corresponding the abnormal weather, allowing the air conditioner to be able to determine the abnormal weather accurately even under a complicated weather condition, thus improving the outdoor unit's capacity of dealing with the abnormal weather, reducing the possibility of failure of the outdoor unit caused by weather, and improving the reliability of the outdoor unit. Besides, the control process does not require manual operation, and can realize automatic adjustment, which simplifies manipulations and helps improving user satisfaction.

In the above embodiment, the air parameter includes any one or combination of temperature, humidity, fine particle content, wind speed, wind direction, rainfall, snowfall.

In this embodiment, the air parameter is defined to include any one or combination of temperature, humidity, fine particle content, wind speed, wind direction, rainfall, snowfall, and the air parameter corresponding to each weather category and the parameter range can be preset in accordance with any one or combination of the above air parameters, allowing the air conditioner to have a reference when determining the abnormal weather under the complicated weather condition, improving the logical determining ability of the air conditioner and accuracy of the determining result, thus improving the outdoor unit's capacity of dealing with the complicate weather condition.

In the above embodiment, said adjusting the operating parameter of the draught fan in the outdoor unit according to the abnormal weather includes: determining the air parameter and the occurrence time period of the abnormal weather; determining an operating cycle of the draught fan in the outdoor unit and a rotation speed corresponding to the operating cycle according to the air parameter and the occurrence time period; and controlling the draught fan to operate at the rotation speed according to the operating cycle.

In this embodiment, the step of adjusting the operating parameter of the draught fan in the outdoor unit according to the abnormal weather is defined. The air parameter and the occurrence time period of the abnormal weather are determined, thus providing a basis for subsequent adjusting the operating parameter of the draught fan in the outdoor unit. The operating cycle of the draught fan in the outdoor unit and the rotation speed corresponding to the operating cycle are determined according to the air parameter and the occurrence time period, and the draught fan is controlled to operate at the rotation speed according to the operating cycle, and different operation schemes for the draught fan in the outdoor unit are formulated for different abnormal weather conditions, and the draught fan is controlled to operate according to the operation scheme, and to control the outdoor unit precisely, thus further improving the outdoor unit's capacity of dealing with the abnormal weather. The operating scheme includes different combinations of the operating cycle and the rotation speed.

In specific, if it is determined that the abnormal weather is snow, the air parameter is snowfall being 100 mm and the occurrence time period is from 10 o'clock to 12 o'clock, the draught fan in the outdoor unit is controlled to operate at the highest operating level from 10 o'clock to 12 o'clock, to operate at one-downshifted level from 12 o'clock to 13 o'clock, and to shut down at 13 o'clock.

In the above embodiment, before said determining an operating cycle of the draught fan in the outdoor unit and a rotation speed corresponding to the operating cycle according to the air parameter and the occurrence time period, the control method further includes: detecting an operating state of the outdoor unit within the occurrence time period; executing the step of determining an operating cycle of the draught fan in the outdoor unit and a rotation speed corresponding to the operating cycle according to the air parameter and the occurrence time period, when the outdoor unit is in a shutdown state, otherwise maintaining the operating state of the outdoor unit.

In this embodiment, before said determining an operating cycle of the draught fan in the outdoor unit and a rotation speed corresponding to the operating cycle according to the air parameter and the occurrence time period, the operating state of the outdoor unit within the occurrence time period is detected, to determine whether the outdoor unit is in operation at the moment, i.e., to determine whether a user is using the air conditioner at the moment. When the outdoor unit is in the shutdown state, the step of determining an operating cycle of the draught fan in the outdoor unit and a rotation speed corresponding to the operating cycle according to the air parameter and the occurrence time period is executed, otherwise the operating state of the outdoor unit is maintained. In other words, the above control step is activated only when the outdoor unit is in the shutdown state, to avoid a conflict between the control logic for the outdoor unit and the user's use requirement, and preventing an adverse influence to user's normal use of the air conditioner. It would be understood that the user's normal use will be adversely and severely influenced if the operating parameter of the draught fan in the outdoor unit is controlled to change during the user's use, which is not conducive to improving user's satisfaction.

In the above embodiment, said obtaining abnormal weather information of a region where the air conditioner is located includes: obtaining the abnormal weather information by at least one sensor disposed at the outdoor unit; and/or obtaining the abnormal weather information by a server communicated with the air conditioner.

In this embodiment, the step of obtaining abnormal weather information of a region where the air conditioner is located is defined. The abnormal weather information may be obtained by at least one sensor disposed at the outdoor unit, and the air conditioner does not need to be connected with external equipment or additionally-installed with monitoring equipment, i.e., the abnormal weather information of a region where the outdoor unit is located can be obtained, with concise and convenience of information transmission and relative low cost. The abnormal weather information may also be obtained by a server communicated with the air conditioner, and more categories of the abnormal weather information can be obtained with high accuracy, and it is possible to obtain forecast information of future weather, which is conducive for the air conditioner to determining the abnormal weather rapidly and accurately. In addition, the air conditioner may also obtain the weather information by at least one sensor disposed at the outdoor unit and a server communicated with the air conditioner both, and makes comprehensive determination of information data, thus further improving the accuracy of the determining result.

It would be understood that communication with the air conditioner includes but not limited to connection via a network cable, wireless network, or mobile communication network.

In the above embodiment, after said controlling the draught fan in the outdoor unit to operate according to the operating parameter, the control method further includes: transmitting a prompt message corresponding to the abnormal weather information and the operating parameter to a target terminal.

In this embodiment, after said controlling the draught fan in the outdoor unit to operate according to the operating parameter, the prompt message corresponding to the abnormal weather information and the operating parameter is transmitted to the target terminal for a reminding action. In specific, the prompt message is transmitted to a user's mobile phone, and to remind the user of the current weather condition and the operating state of the outdoor unit, which is conducive to improving the user experience. In addition, an instruction may also be transmitted to another smart device which is communicated with the air conditioner, to for example control a smart window to close automatically, control a smart voice speaker to play weather forecast or road condition information, and control a smart humidifier to turn on.

In the above embodiment, before said obtaining abnormal weather information of a region where the air conditioner is located, the control method further includes: obtaining a locating position of the outdoor unit of the air conditioner; determining whether the locating position is an open-air area; and executing the step of obtaining abnormal weather information of a region where the air conditioner is located, when it is determined that the locating position is the open-air area.

In this embodiment, before said obtaining abnormal weather information of a region where the air conditioner is located, the locating position of the outdoor unit of the air conditioner is obtained first, to determine whether the outdoor unit will be influenced by whether. When it is determined that the outdoor unit is located in the open-air area, the step of obtaining abnormal weather information of a region where the air conditioner is located is executed, and to avoid the outdoor unit from automatically turning on and operating without protection measurements, thus improving accuracy of the control method and effectively reducing energy consumption and cost for use.

One embodiment of the present disclosure provides in an embodiment an air conditioner, including: an outdoor unit; at least one indoor unit, each of which is connected to the outdoor unit; and a memory and a processor, wherein the memory has stored therein a computer program executable by the processor, and the processor when executing the computer program implements steps of the control method according to any one of the above embodiments.

According to the embodiment of the present disclosure, the air conditioner includes: an outdoor unit; at least one indoor unit, each of which is connected to the outdoor unit; and a memory and a processor, wherein the memory has stored therein a computer program executable by the processor, and the processor when executing the computer program implements steps of the control method according to any one of the above embodiments, and the air conditioner has all advantages of the control method in any one of the above embodiments, which are not repeated herein.

One embodiment of the present disclosure provides in an embodiment a computer readable storage medium having stored therein a computer program that, when executed by a processor, implements steps of the control method according to any one of the above embodiments.

According to the embodiment of the present disclosure, the computer readable storage medium having stored therein a computer program that, when executed by a processor, implements steps of the control method according to any one of the above embodiments, and the computer readable storage medium has all advantages of the control method in any one of the above embodiments, which are not repeated herein.

Embodiments of the present disclosure will become apparent in the following description, or would be understood through the practice of the present disclosure.

BRIEF DESCRIPTION OF THE DRAWINGS

Embodiments of the present disclosure will become more clear with the following description for embodiments by combining the drawings.

DETAILED DESCRIPTION OF THE DISCLOSURE

In order to be able to understand the embodiments of the present disclosure more clearly, the present disclosure will be further described in details below in conjunction with the accompanying drawings and specific embodiments. It should be noted that the embodiments of the present disclosure and the features in the embodiments can be combined with each other without conflict.

In the following description, many specific details are set forth in order to fully understand the present disclosure. However, the present disclosure can also be implemented in other ways different from those described herein. Therefore, the protection scope of the present disclosure is not limited by the specific embodiments below.

The control method according to some embodiments of the present disclosure is described below with reference to FIGS. 1 to 11.

Figure 1:
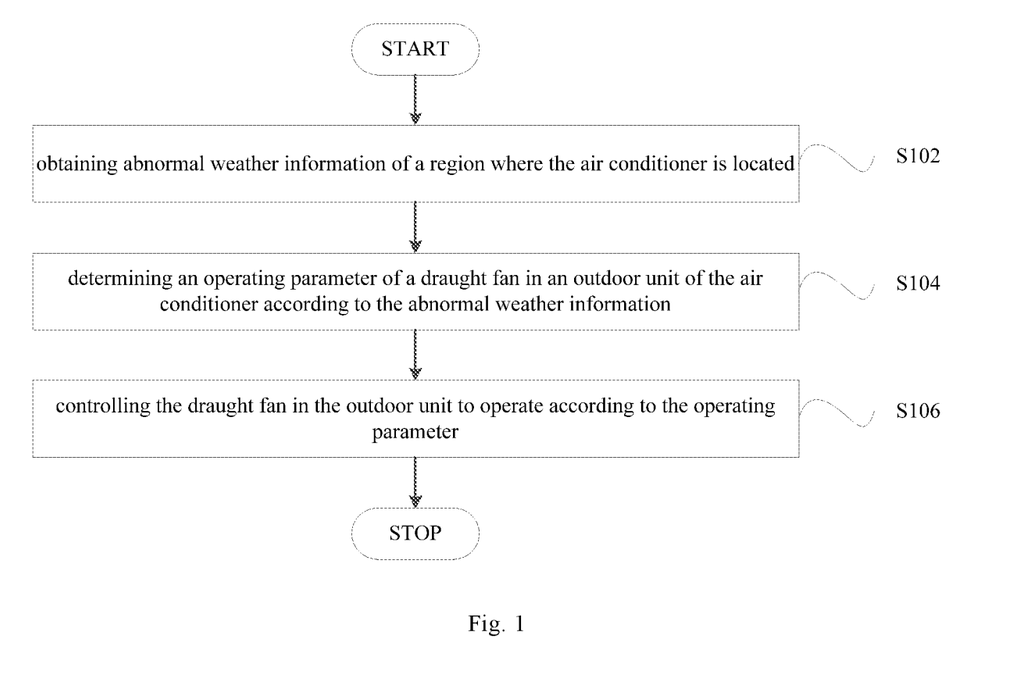
FIG. 1 is a schematic flow chart showing a control method according to an embodiment of the present disclosure.

As shown in FIG. 1, the present disclosure provides in an embodiment a control method, used for an air conditioner, including: step S102, obtaining abnormal weather information of a region where the air conditioner is located; step S104, determining an operating parameter of a draught fan in an outdoor unit of the air conditioner according to the abnormal weather information; and step S106, controlling the draught fan in the outdoor unit to operate according to the operating parameter.

In this embodiment, by the step S102 and the step S104, the operating parameter, corresponding to the abnormal weather in the region, of the outdoor unit can be determined according to different abnormal weather conditions; and by the step S106, the outdoor unit can be operated according to the optimal operating parameter under different abnormal weather conditions, to reduce an adverse impact of weather on the operation of the outdoor unit, reduce a possibility of failure or abnormality of the outdoor unit caused by weather, and delay the aging of the outdoor unit, thus decreasing the cost for use. Besides, it is possible to realize smart control of the air conditioner, which is conducive to improving customer satisfaction. The abnormal weather includes but not limited to rain, snow, sand and dust, storm wind, hail, and other weather that may adversely affect the outdoor unit. The air conditioner may be preset with an operating parameter of the outdoor unit for different weather conditions, and the outdoor unit may be switched to operate according to the operating parameter corresponding to the current weather condition.

It would be understood that the outdoor unit of the air conditioner is usually disposed in an outdoor environment such as at roof or windowsill. Under different weather conditions, especially an abnormal weather condition, if there is no corresponding protective countermeasure, it is easy to cause failure or accelerated aging.

In addition, the control method provided in the above embodiment of the present disclosure may further have the following additional features.

Figure 2:
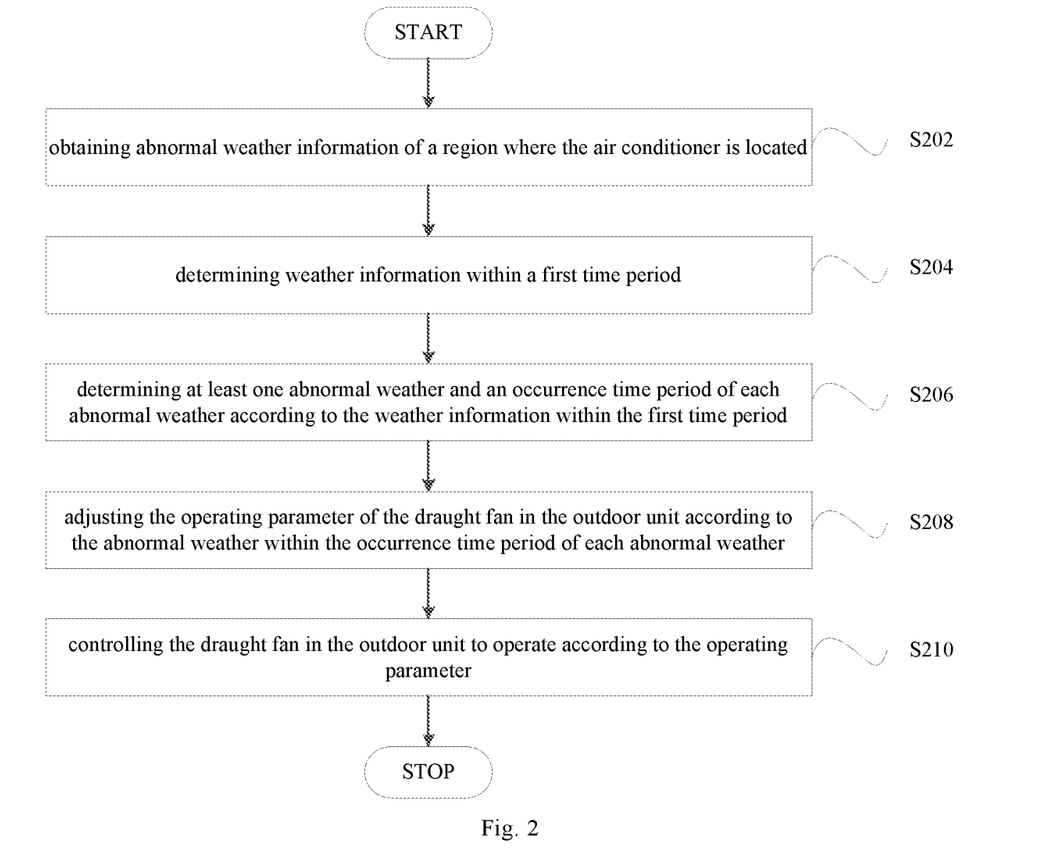
FIG. 2 is a schematic flow chart showing a control method according to an embodiment of the present disclosure.

In an embodiment of the present disclosure, as shown in FIG. 2, the control method includes: step S202, obtaining abnormal weather information of a region where the air conditioner is located; step S204, determining weather information within a first time period; step S206, determining at least one abnormal weather and an occurrence time period of each abnormal weather according to the weather information within the first time period; step S208, adjusting the operating parameter of the draught fan in the outdoor unit according to the abnormal weather within the occurrence time period of each abnormal weather; and step S210, controlling the draught fan in the outdoor unit to operate according to the operating parameter.

In this embodiment, the step S204 allows the obtained abnormal weather to be timely-updated weather information, to improve accuracy of the obtained abnormal weather information, which is conducive to accurately controlling the outdoor unit. In one embodiment, the first time period may be set to be e.g., 30 or 60 seconds. Next, by the step S206, the abnormal weather and the occurrence time period of the abnormal weather are determined, thus providing a basis for determining the operating parameter corresponding to the abnormal weather of the draught fan in the outdoor unit. The step S208 allows the outdoor unit can be operated according to the optimal operating parameter corresponding to the abnormal weather within the occurrence time period of each abnormal weather, thus reducing the adverse impact of the abnormal weather on the outdoor unit, reducing the possibility of failure of the outdoor unit caused by the abnormal weather, and delaying the aging of the outdoor unit.

It should emphasize that the weather information within the first time period may be obtained by real-time monitoring or from external information such as weather forecast. The real-time monitoring may be to monitor the real-time weather information by a sensor carried by the outdoor unit, or to monitor the real-time weather information by additionally-installed monitoring equipment.

Figure 3:
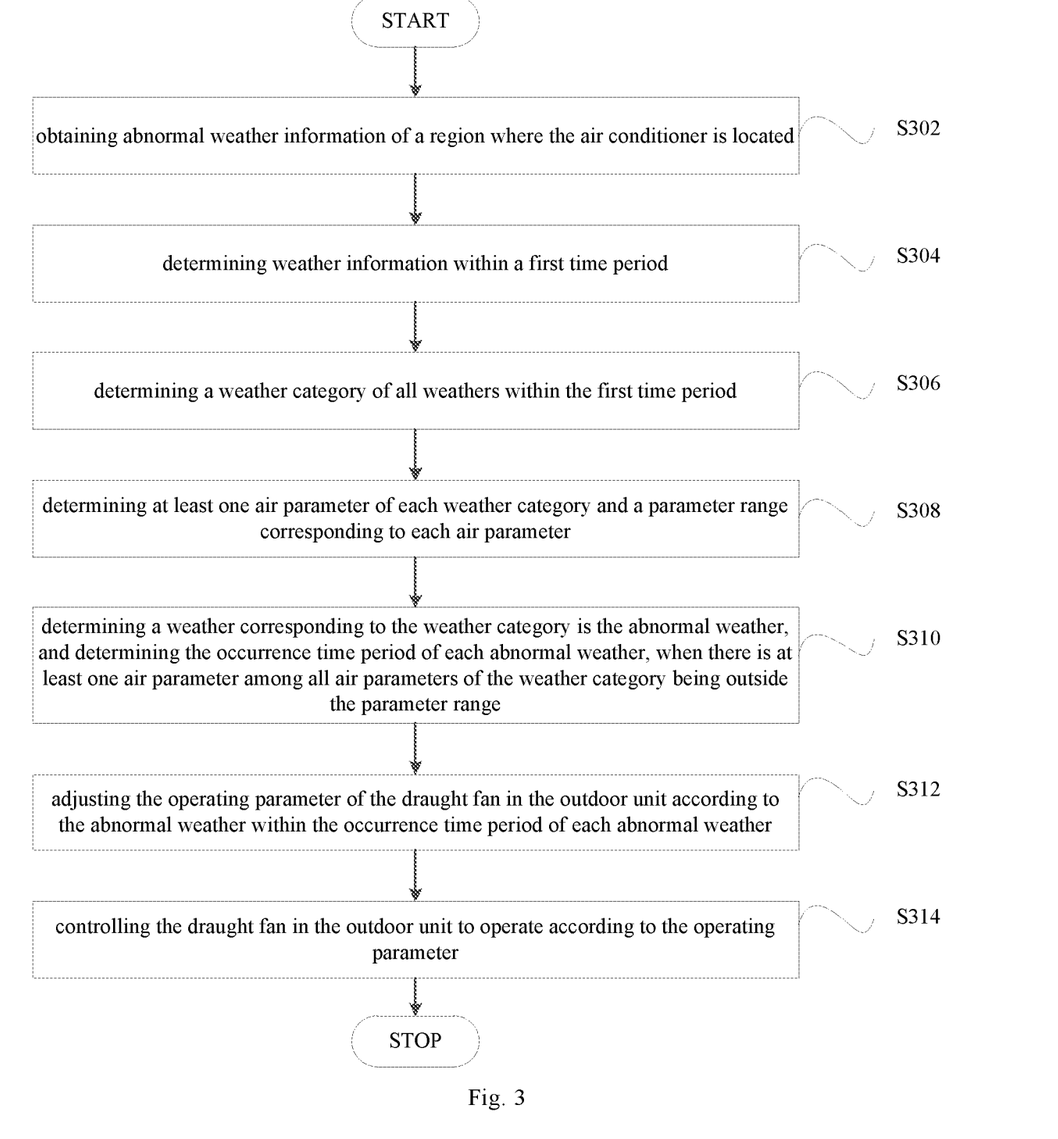
FIG. 3 is a schematic flow chart showing a control method according to an embodiment of the present disclosure.

In an embodiment of the present disclosure, as shown in FIG. 3, the control method includes: step S302, obtaining abnormal weather information of a region where the air conditioner is located; step S304, determining weather information within a first time period; step S306, determining a weather category of all weathers within the first time period; step S308, determining at least one air parameter of each weather category and a parameter range corresponding to each air parameter; step S310, determining a weather corresponding to the weather category is the abnormal weather and determining the occurrence time period of each abnormal weather, when there is at least one air parameter among all air parameters of the weather category being outside the parameter range; step S312, adjusting the operating parameter of the draught fan in the outdoor unit according to the abnormal weather within the occurrence time period of each abnormal weather; and step S314, controlling the draught fan in the outdoor unit to operate according to the operating parameter.

In this embodiment, by the step S308, the weather category of all weathers within the first time period is determined, and different weather categories in a current weather condition are obtained, which is more accurate than that using a single category of weather as a reference. It would be understood that multiple categories of weather may occur at the same time under the actual weather condition, for example rain mixed with snow, and storm wind and rain. At least one air parameter of each weather category and a parameter range corresponding to each air parameter are determined, to provide a basis for subsequent determination of the abnormal weather. In specific, the air parameter of each weather category and the parameter range corresponding to said air parameter may be set in advance. For example, the air parameter of rain is set as rainfall, and the parameter range is set as 20 mm to 40 mm. By the step S310, when there is at least one air parameter among all air parameters of the weather category being outside the parameter range, it is determined that the weather corresponding to said weather category is the abnormal weather. In other words, the air parameters of each weather category are screened, and the weather category with an air parameter exceeding the corresponding parameter range is determined as the abnormal weather, and the draught fan in the outdoor unit is controlled to switch to operate according to the operating parameter corresponding to the abnormal weather, allowing the air conditioner to be able to determine the abnormal weather accurately even under a complicated weather condition, thus improving the outdoor unit's capacity of dealing with the abnormal weather, reducing the possibility of failure of the outdoor unit caused by weather, and improving the reliability of the outdoor unit. Besides, the control process does not require manual operation, and can realize automatic adjustment, which simplifies manipulations and helps improving user satisfaction.

In some embodiments, the air parameter includes any one or combination of temperature, humidity, fine particle content, wind speed, wind direction, rainfall, snowfall. By selecting different air parameters and combining the air parameters for different weather conditions, the corresponding air parameter to be detected (i.e., the parameter range) is determined, and to provide a reference for determining whether the current weather is the abnormal weather, thus allowing the air conditioner to be able to accurately determine the abnormal weather even under the complicated weather condition, improving the logical determining ability of the air conditioner and accuracy of the determining result, thus improving the outdoor unit's capacity of dealing with the complicate weather condition.

Figure 4:
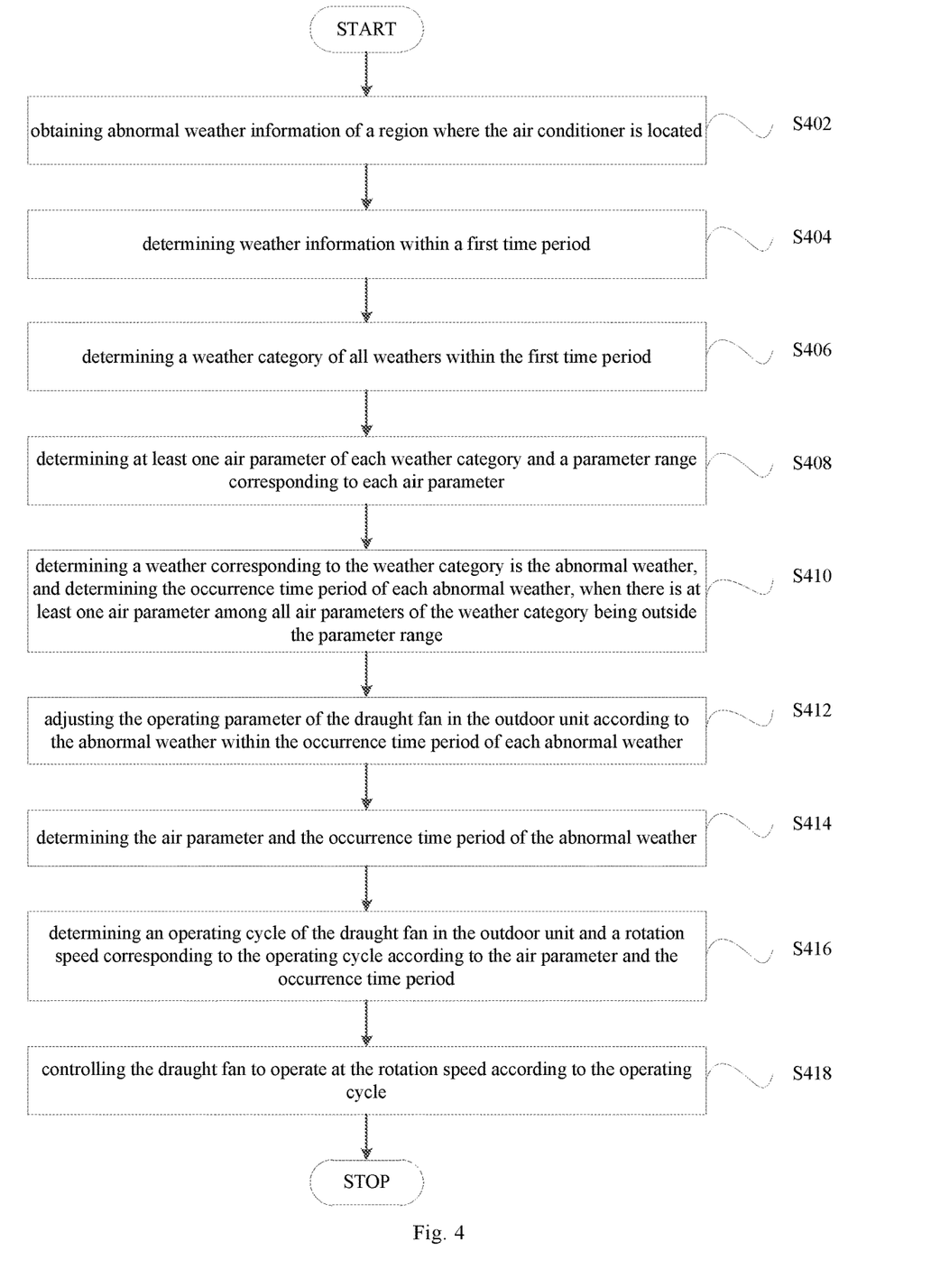
FIG. 4 is a schematic flow chart showing a control method according to an embodiment of the present disclosure.

In an embodiment of the present disclosure, as shown in FIG. 4, the control method includes: step S402, obtaining abnormal weather information of a region where the air conditioner is located; step S404, determining weather information within a first time period; step S406, determining a weather category of all weathers within the first time period; step S408, determining at least one air parameter of each weather category and a parameter range corresponding to each air parameter; step S410, determining a weather corresponding to the weather category is the abnormal weather and determining the occurrence time period of each abnormal weather, when there is at least one air parameter among all air parameters of the weather category being outside the parameter range; step S412, adjusting the operating parameter of the draught fan in the outdoor unit according to the abnormal weather within the occurrence time period of each abnormal weather; step S414, determining the air parameter and the occurrence time period of the abnormal weather; step S416, determining an operating cycle of the draught fan in the outdoor unit and a rotation speed corresponding to the operating cycle according to the air parameter and the occurrence time period; and step S418, controlling the draught fan in the outdoor unit to operate at the rotation speed according to the operating cycle.

In this embodiment, by the step S414, the air parameter and the occurrence time period of the abnormal weather are determined, thus providing a basis for subsequent adjusting the operating parameter of the draught fan in the outdoor unit; by the step S416 and the step S418, different operation schemes for the draught fan in the outdoor unit are formulated for different abnormal weather conditions, and the draught fan is controlled to operate according to the operation scheme, and to control the outdoor unit precisely, thus further improving the outdoor unit's capacity of dealing with the abnormal weather. The operating scheme includes different combinations of the operating cycle and the rotation speed.

In specific, if it is determined that the abnormal weather is snow, the air parameter is snowfall being 100 mm and the occurrence time period is from 10 o'clock to 12 o'clock, the draught fan in the outdoor unit is controlled to operate at the highest operating level from 10 o'clock to 12 o'clock, to operate at one-downshifted level from 12 o'clock to 13 o'clock, and to shut down at 13 o'clock.

Figure 5:
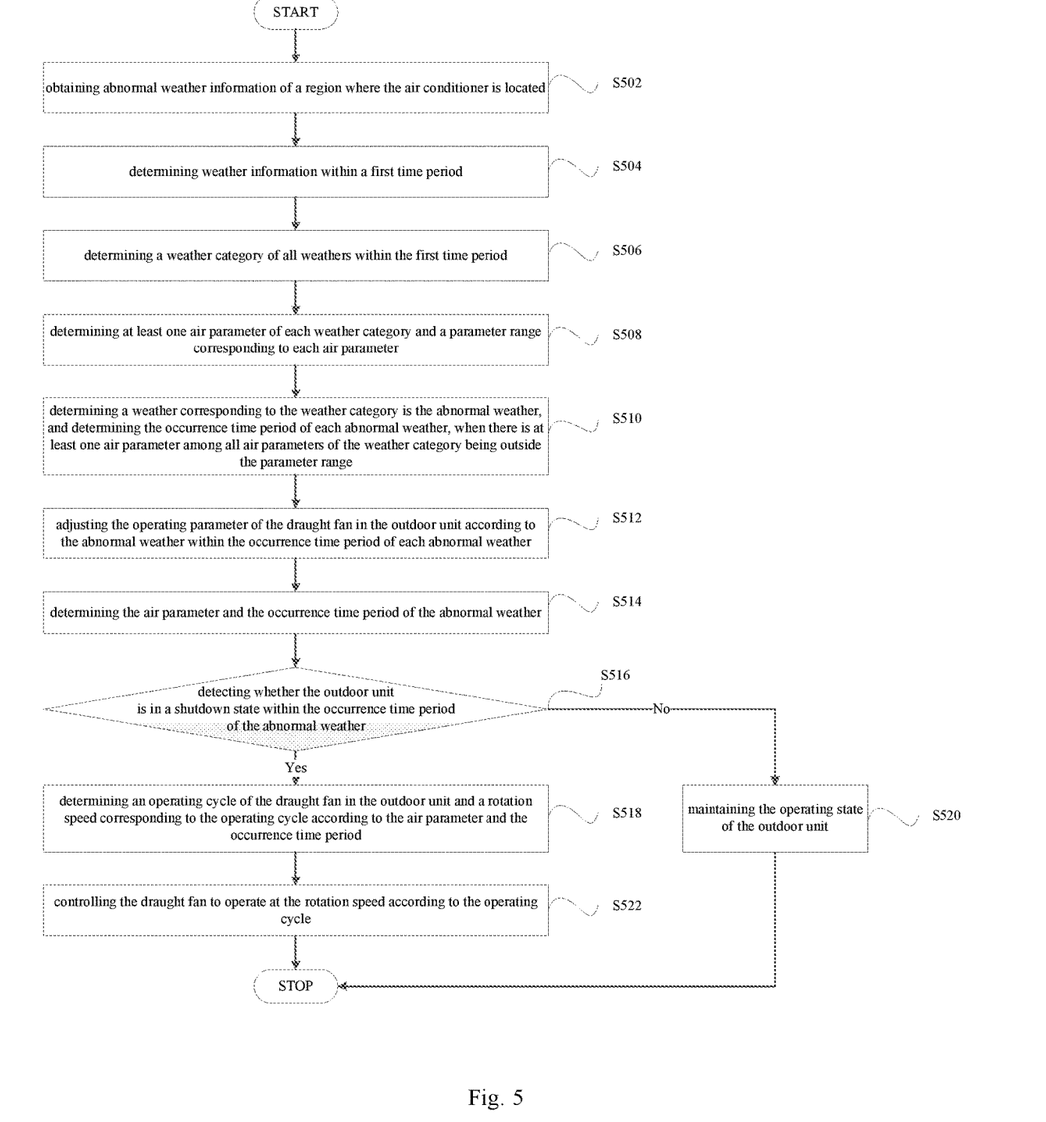
FIG. 5 is a schematic flow chart showing a control method according to an embodiment of the present disclosure.

In an embodiment of the present disclosure, as shown in FIG. 5, the control method includes: step S502, obtaining abnormal weather information of a region where the air conditioner is located; step S504, determining weather information within a first time period; step S506, determining a weather category of all weathers within the first time period; step S508, determining at least one air parameter of each weather category and a parameter range corresponding to each air parameter; step S510, determining a weather corresponding to the weather category is the abnormal weather and determining the occurrence time period of each abnormal weather, when there is at least one air parameter among all air parameters of the weather category being outside the parameter range; step S512, adjusting the operating parameter of the draught fan in the outdoor unit according to the abnormal weather within the occurrence time period of each abnormal weather; step S514, determining the air parameter and the occurrence time period of the abnormal weather; step S516, detecting whether the outdoor unit is in a shutdown state within the occurrence time period of the abnormal weather; if the detection result is "yes", executing step S518, determining an operating cycle of the draught fan in the outdoor unit and a rotation speed corresponding to the operating cycle according to the air parameter and the occurrence time period; and then executing step S522, controlling the draught fan to operate at the corresponding rotation speed according to the operating cycle; if the detection result of the step S516 is "no", executing step S520, maintaining the operating state of the outdoor unit.

In this embodiment, by the step S516, the operating state of the outdoor unit within the occurrence time period of the abnormal weather is detected, to determine whether the outdoor unit is in operation at the moment, i.e., to determine whether a user is using the air conditioner at the moment. When the outdoor unit is in the shutdown state, the step S518 is executed, otherwise the step S520 is executed. In other words, the above control step is activated only when the outdoor unit is in the shutdown state, to avoid a conflict between the control logic for the outdoor unit and the user's use requirement, and preventing an adverse influence to user's normal use of the air conditioner. It would be understood that the user's normal use will be adversely and severely influenced if the operating parameter of the draught fan in the outdoor unit is controlled to change during the user's use, which is not conducive to improving user's satisfaction.

Figure 6:
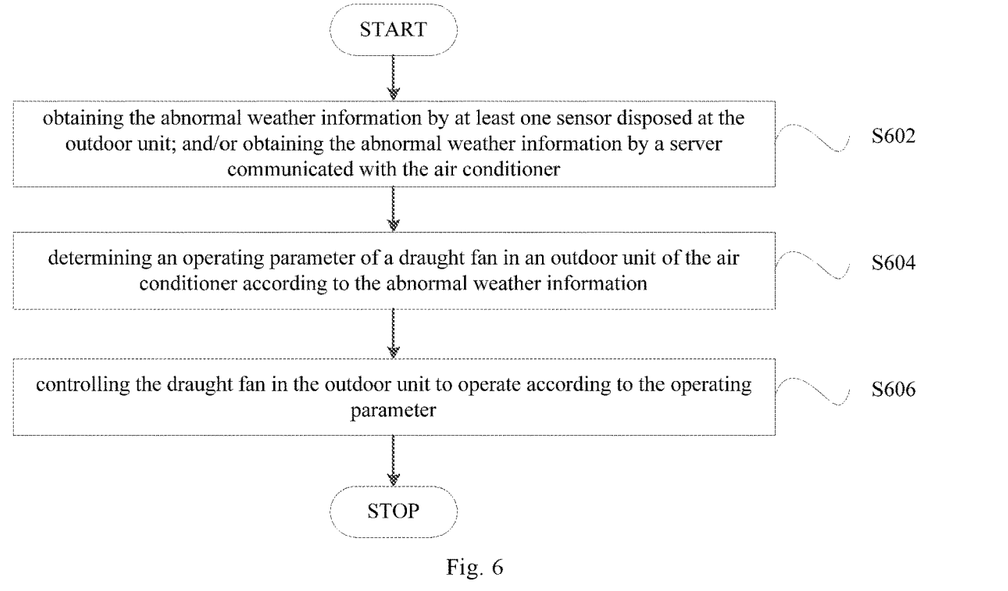
FIG. 6 is a schematic flow chart showing a control method according to an embodiment of the present disclosure.

In an embodiment of the present disclosure, as shown in FIG. 6, the control method includes: step S602, obtaining the abnormal weather information by at least one sensor disposed at the outdoor unit; and/or obtaining the abnormal weather information by a server communicated with the air conditioner; step S604, determining an operating parameter of a draught fan in an outdoor unit of the air conditioner according to the abnormal weather information; and step S606, controlling the draught fan in the outdoor unit to operate according to the operating parameter.

In this embodiment, on the basis of embodiment as shown in FIG. 1, the step S102 is defined. By the step 602, the abnormal weather information may be obtained by at least one sensor disposed at the outdoor unit, and the air conditioner does not need to be connected with external equipment or additionally-installed with monitoring equipment, i.e., the abnormal weather information of a region where the outdoor unit is located can be obtained, with concise and convenience of information transmission and relative low cost. The abnormal weather information may also be obtained by a server communicated with the air conditioner, and more categories of the abnormal weather information can be obtained with high accuracy, and it is possible to obtain forecast information of future weather, which is conducive for the air conditioner to determining the abnormal weather rapidly and accurately. In addition, the air conditioner may also obtain the weather information by at least one sensor disposed at the outdoor unit and a server communicated with the air conditioner both, and makes comprehensive determination of information data, thus further improving the accuracy of the determining result.

It would be understood that communication with the air conditioner includes but not limited to connection via a network cable, wireless network, or mobile communication network.

Figure 7:
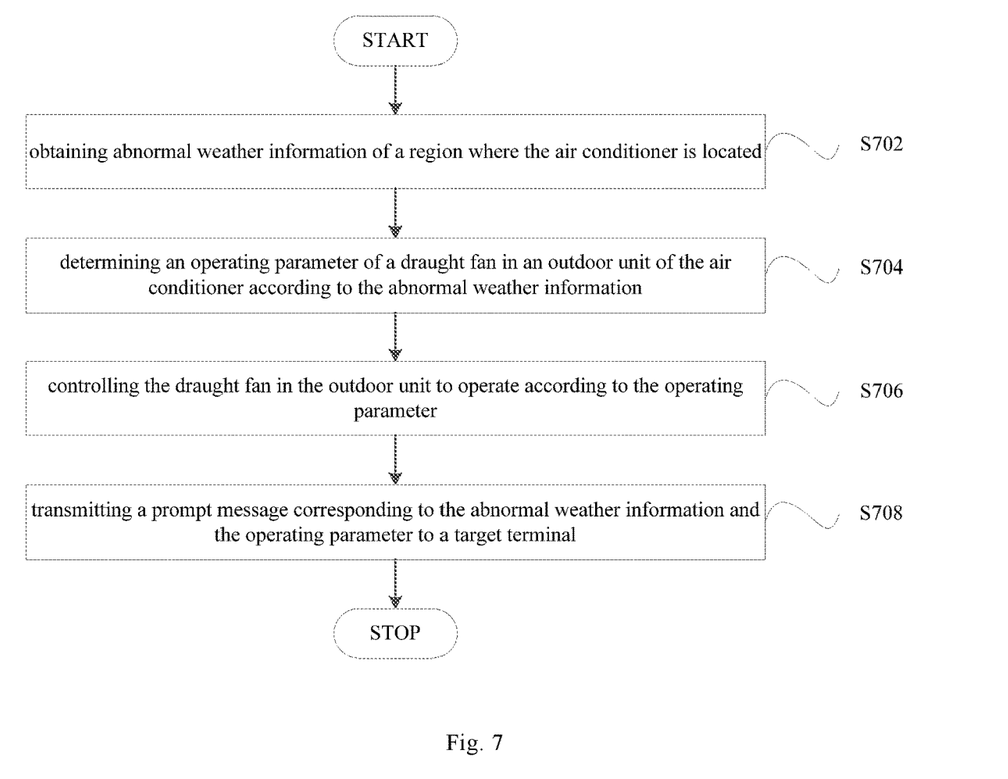
FIG. 7 is a schematic flow chart showing a control method according to an embodiment of the present disclosure.

In an embodiment of the present disclosure, as shown in FIG. 7, the control method includes: step S702, obtaining abnormal weather information of a region where the air conditioner is located; step S704, determining the operating parameter of the draught fan in the outdoor unit of the air conditioner according to the abnormal weather information; step S706, controlling the draught fan in the outdoor unit to operate according to the operating parameter; and step S708, transmitting a prompt message corresponding to the abnormal weather information and the operating parameter to a target terminal.

In this embodiment, by the step S708, after controlling the draught fan in the outdoor unit to operate according to the operating parameter, the prompt message corresponding to the abnormal weather information and the operating parameter is transmitted to the target terminal for a reminding action. In specific, the prompt message is transmitted to a user's mobile phone, and to remind the user of the current weather condition and the operating state of the outdoor unit, which is conducive to improving the user experience.

In addition, the air conditioner may further transmit an instruction to another smart device which is communicated with the air conditioner according to the weather condition, to for example control a smart window to close automatically, control a smart voice speaker to play weather forecast or road condition information, and control a smart humidifier to turn on.

Figure 8:
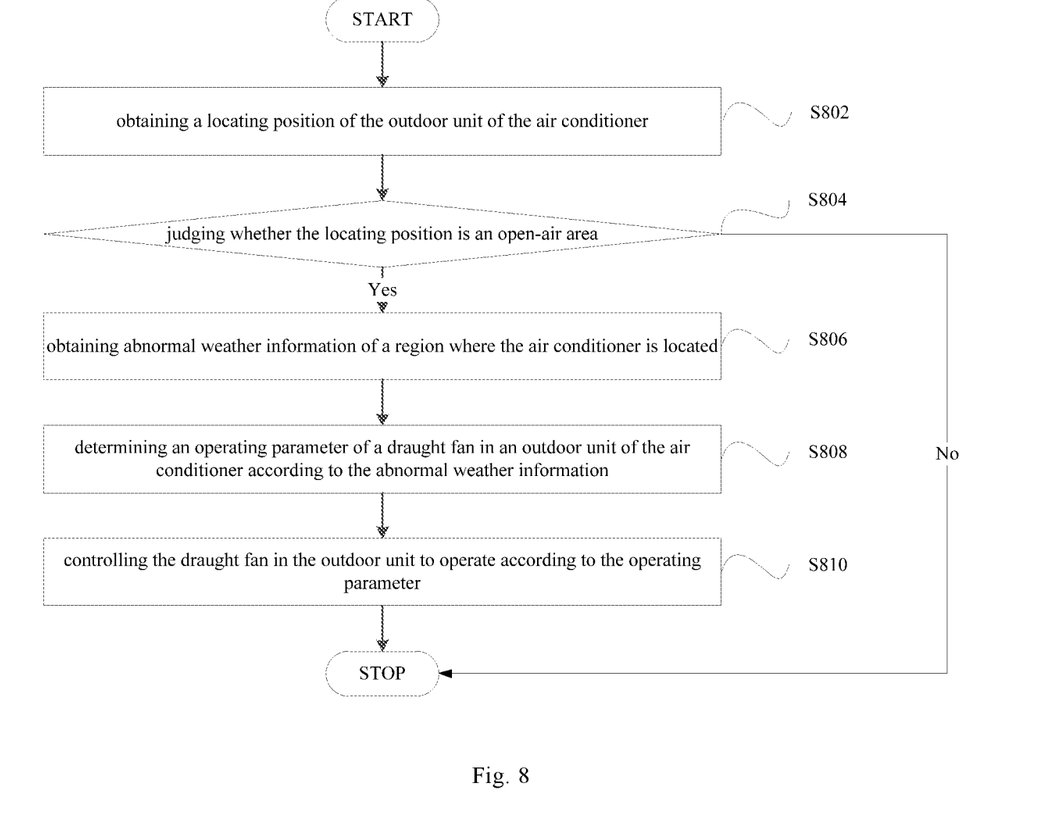
FIG. 8 is a schematic flow chart showing a control method according to an embodiment of the present disclosure.

In an embodiment of the present disclosure, as shown in FIG. 8, the control method includes: step S802, obtaining a locating position of the outdoor unit of the air conditioner; step S804, determining whether the locating position is an open-air area; when the locating position of the outdoor unit is an open-air area, executing step S806, obtaining the abnormal weather information of a region where the air conditioner is located; step S808, determining the operating parameter of the draught fan in the outdoor unit of the air conditioner according to the abnormal weather information; and step S810, controlling the draught fan in the outdoor unit to operate according to the operating parameter.

In this embodiment, by the step S802 to the step S804, the locating position of the outdoor unit of the air conditioner is obtained first, to determine whether the outdoor unit will be influenced by whether. When it is determined that the outdoor unit is located in the open-air area, the step of obtaining abnormal weather information of a region where the air conditioner is located is executed, and to avoid the outdoor unit from automatically turning on and operating without protection measurements, thus improving accuracy of the control method and effectively reducing energy consumption and cost for use.

Figure 9:
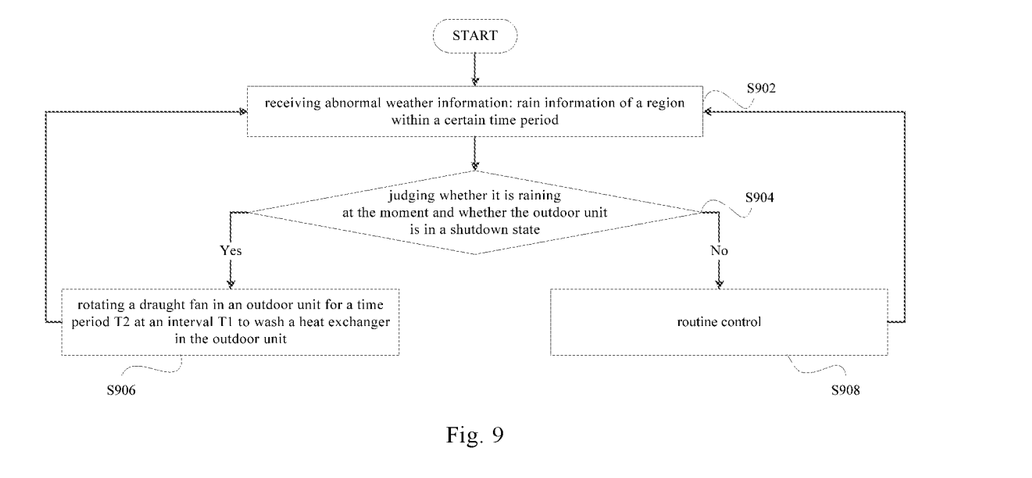
FIG. 9 is a schematic flow chart showing a control method according to a specific embodiment of the present disclosure.

According to the control method in a specific embodiment of the present disclosure, as shown in FIG. 9, the abnormal weather is rain, by step S902, receiving abnormal weather information: rain information of a region within a predetermined period, for example it rains from 10 o'clock to 12 o'clock at a day; by step S904, determining whether it is raining at the moment and whether the outdoor unit is in a shutdown state; if the determining result is yes, executing step S906, rotating the draught fan in the outdoor unit for a time period T2 at an interval T1, to wash a heat exchanger in the outdoor unit; if the determining result is no, executing step S908, executing routine control, to maintain the current operating state of the outdoor unit. T1, T2 and the operating level of the draught fan depend on the occurrence time period of the rain and the rainfall. In some examples, T1 is 5 min to 30 min; T2 is 1 min to 5 min; and the operating level of the draught fan in the outdoor unit is the highest operating level. When the rainfall is relative large, T1 may be increased, T2 may be decreased, and the draught fan may be operated at the highest operating level for a time period T3 after the rain stops. In some examples, T3=2*T2. According to this embodiment, the control method can effective provide anti-dusting and washing for the heat exchanger in the outdoor unit by virtue of the rain, which is conducive to reducing the possibility of failure of the heat exchanger in the outdoor unit, thus reducing maintenance cost.

Figure 10:
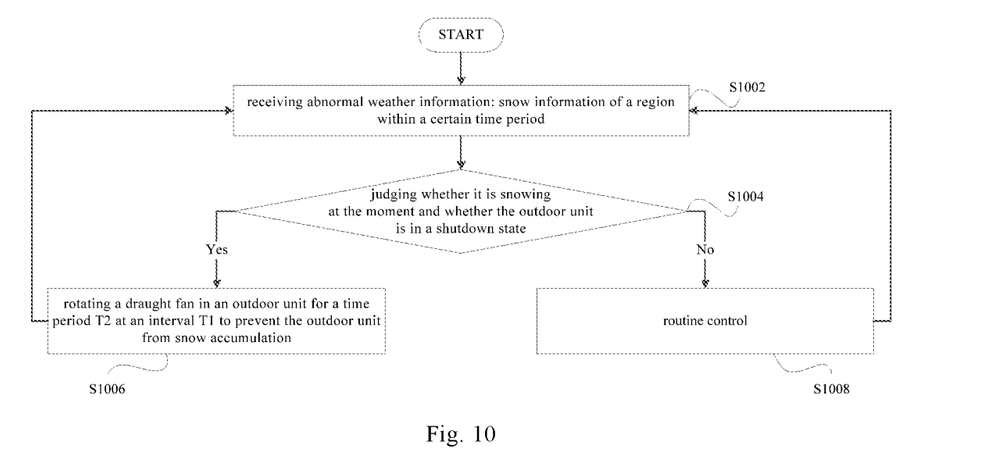
FIG. 10 is a schematic flow chart showing a control method according to a specific embodiment of the present disclosure.

According to the control method in a specific embodiment of the present disclosure, as shown in FIG. 10, the abnormal weather is snow, by step S1002, receiving abnormal weather information: snow information of a region within a predetermined period, for example it snows from 10 o'clock to 12 o'clock at a day; by step S1004, determining whether it is snowing at the moment and whether the outdoor unit is in a shutdown state; if the determining result is yes, executing step S1006, rotating the draught fan in the outdoor unit for a time period T2 at an interval T1, to prevent the outdoor unit from snow accumulation; if the determining result is no, executing step S1008, executing routine control, to maintain the current operating state of the outdoor unit. T1, T2 and the operating level of the draught fan depend on the occurrence time period of the snow and the snowfall. In some examples, T1 is 5 min to 30 min; T2 is 1 min to 5 min; and the operating level of the draught fan in the outdoor unit is the highest operating level. When the snowfall is relative large, T1 may be decreased and T2 may be increased, and the draught fan may be operated at the highest operating level. According to this embodiment, the control method can effective prevent the outdoor unit from abnormal operation of the draught fan caused by snow accumulation, which is conducive to reducing the possibility of failure of the draught fan in the outdoor unit, thus reducing maintenance cost.

Figure 11:
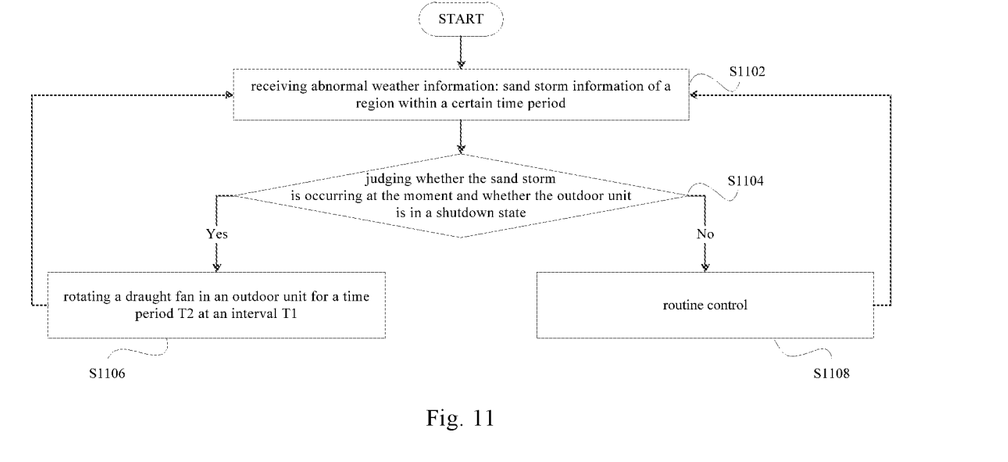
FIG. 11 is a schematic flow chart showing a control method according to a specific embodiment of the present disclosure.

According to the control method in a specific embodiment of the present disclosure, as shown in FIG. 11, the abnormal weather is sand storm, by step S1102, receiving abnormal weather information: sand storm information of a region within a predetermined period, for example sand storm occurs from 10 o'clock to 12 o'clock at a day; by step S1104, determining whether sand storm is occurring at the moment and whether the outdoor unit is in a shutdown state; if the determining result is yes, executing step S1106, rotating the draught fan in the outdoor unit for a time period T2 at an interval T1; if the determining result is no, executing step S1108, executing routine control, to maintain the current operating state of the outdoor unit. T1, T2 and the operating level of the draught fan depend on the occurrence time period of the sand storm and the level of sand storm. In some examples, T1 is 5 min to 30 min; T2 is 1 min to 5 min; and the operating level of the draught fan in the outdoor unit is the highest operating level. When the sand storm is relative large, T1 may be decreased, T2 may be increased, and the draught fan may be operated at the highest level for a time period T3 after the sand storm stops. In some examples, T3=2*T2. According to this embodiment, the control method can effective provide sand prevention and removal for the outdoor unit, which is conducive to reducing the possibility of failure in the outdoor unit, thus reducing maintenance cost.

In an embodiment of the present disclosure, provided is an air conditioner, including: an outdoor unit; at least one indoor unit, each of which is connected to the outdoor unit; and a memory and a processor, wherein the memory has stored therein a computer program executable by the processor, and the processor when executing the computer program implements steps of the control method according to any one of the above embodiments.

According to the embodiment of the present disclosure, the air conditioner includes: an outdoor unit; at least one indoor unit, each of which is connected to the outdoor unit; and a memory and a processor, wherein the memory has stored therein a computer program executable by the processor, and the processor when executing the computer program implements steps of the control method according to any one of the above embodiments, and the air conditioner has all advantages of the control method in any one of the above embodiments, which are not repeated herein.

In an embodiment of the present disclosure, provided is a computer readable storage medium having stored therein a computer program that, when executed by a processor, implements steps of the control method according to any one of the above embodiments.

In this embodiment, the computer readable storage medium having stored therein a computer program that, when executed by a processor, implements steps of the control method according to any one of the above embodiments, and the computer readable storage medium has all advantages of the control method in any one of the above embodiments, which are not repeated herein.

Embodiments of the present disclosure is described in details above in conjunction with the accompanying drawings. The outdoor unit is controlled to operate at the operating parameter corresponding to the weather condition according to different weather conditions, thus effectively reducing the possibility of abnormality or failure of the outdoor unit caused by weather, delaying the aging of the outdoor unit, and facilitating to reduce the maintenance cost for the outdoor unit.

In the present disclosure, the terms such as "first", "second" and "third" are used herein for purposes of description and are not intended to indicate or imply relative importance; the term "a plurality of" means two or more unless specified otherwise; the terms "mounted", "connected", "coupled", "fixed" and the like are used broadly, and may be, for example, fixed connections, detachable connections, or integrated connections; may also be direct connections or indirect connections via an intervening structure.

In the specification, it should be understood that, the terms indicating orientation or position relationship such as "above", "below", "right", "left", "front" and "rear" should be construed to refer to the orientation or position relationship as shown in the drawings. These terms are merely for convenience and concision of description and do not alone indicate or imply that the device or unit referred to must have a particular orientation or must be configured or operated in a particular orientation. Thus, it cannot be understood to limit the present disclosure.

In the specification, the term "an embodiment", "some embodiments", or "a specific embodiment" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples", in various places throughout this specification are not necessarily referring to the same embodiment or example of the present disclosure. Furthermore, the particular features, structures, materials, or characteristics may be combined in any suitable manner in one or more embodiments or examples.

What is claimed is:

1. A control method, used to an air conditioner, comprising:
    obtaining a weather information of a region where the air conditioner is located by at least one sensor disposed at an outdoor unit of the air conditioner;
    determining a weather category;
    determining at least one air parameter of the weather category and a parameter range corresponding to each air parameter;
    determining a weather corresponding to the weather category is an abnormal weather when there is at least one air parameter among all air parameters of the weather category being outside the parameter range;
    obtaining abnormal weather information;
    determining operating state of the outdoor unit;
    if the outdoor unit is in shutdown state, determining an operating parameter of a draught fan in the outdoor unit according to the abnormal weather information, and controlling the draught fan to operate according to the operating parameter; and
    if the outdoor unit is in operating state, executing routine control to maintain the current operating state of the outdoor unit.

2. The control method according to claim 1, wherein said determining an operating parameter of a draught fan in an outdoor unit of the air conditioner according to the abnormal weather information comprises:
    determining weather information within a first time period;
    determining at least one abnormal weather and an occurrence time period of each abnormal weather according to the weather information within the first time period; and
    adjusting the operating parameter of the draught fan in the outdoor unit according to the abnormal weather within the occurrence time period of each abnormal weather.

3. The control method according to claim 1, wherein the air parameter comprises any one or combination of temperature, humidity, fine particle content, wind speed, wind direction, rainfall, or snowfall.

4. The control method according to claim 1, wherein said adjusting the operating parameter of the draught fan in the outdoor unit according to the abnormal weather information comprises:

determining the air parameter and the occurrence time period of the abnormal weather;

determining an operating cycle of the draught fan in the outdoor unit and a rotation speed corresponding to the operating cycle according to the air parameter and the occurrence time period; and controlling the draught fan to operate at the rotation speed according to the operating cycle.

5. The control method according to claim 4, wherein before said determining an operating cycle of the draught fan in the outdoor unit and a rotation speed corresponding to the operating cycle according to the air parameter and the occurrence time period, the control method further comprises:

detecting an operating state of the outdoor unit within the occurrence time period;

executing the step of determining an operating cycle of the draught fan in the outdoor unit and a rotation speed corresponding to the operating cycle according to the air parameter and the occurrence time period, when the outdoor unit is in a shutdown state, otherwise maintaining the operating state of the outdoor unit.

6. The control method according to claim 1, wherein after said controlling the draught fan in the outdoor unit to operate according to the operating parameter, the method further comprises:

transmitting a prompt message corresponding to the abnormal weather information and the operating parameter to a target terminal.

7. The control method according to claim 1, wherein before said obtaining a weather information of a region where the air conditioner is located, the method further comprises:

obtaining a locating position of the outdoor unit of the air conditioner;

determining whether the locating position is an open-air area; and executing the step of obtaining abnormal weather information of a region where the air conditioner is located, in response to that it is determined that the locating position is the open-air area.

8. The control method according to claim 1, after determining the weather corresponding to the weather category is the abnormal weather, the control method further comprises:

determining whether the outdoor unit is in a shutdown state;

if the outdoor unit is in the shutdown state, rotating the draught fan in the outdoor unit for a time period T2 at an interval T1 to wash a heat exchanger in the outdoor unit;

if the outdoor unit is in operating state, executing routine control to maintain the current operating state of the outdoor unit.

9. The control method according to claim 8, wherein when the air parameter is beyond a preset value, the draught fan is operated at highest operating level for a time period T3 after the abnormal weather stops.

10. The control method according to claim 9, wherein T3=2*T2.

11. An air conditioner, comprising:
an outdoor unit;
at least one indoor unit connected to the outdoor unit; and
a memory and a processor;
wherein the memory has stored therein a computer program executable by the processor, when executing the computer program, the computer program causes the processor to:

obtain a weather information of a region where the air conditioner is located by at least one sensor disposed at the outdoor unit;

determine a weather category;

determine at least one air parameter of the weather category and a parameter range corresponding to each air parameter;

determine a weather corresponding to the weather category is an abnormal weather when there is at least one air parameter among all air parameters of the weather category being outside the parameter range;

obtain abnormal weather information;

determine operating state of the outdoor unit;

if the outdoor unit is in shutdown state, determine an operating parameter of a draught fan in the outdoor unit according to the abnormal weather information, and control the draught fan to operate according to the operating parameter; and if the outdoor unit is in operating state, execute routine control to maintain the current operating state of the outdoor unit.

12. The air conditioner according to claim 11, after determining the weather corresponding to the weather category is the abnormal weather, the computer program further causes the processor to:

determine whether the outdoor unit is in a shutdown state;

if the outdoor unit is in the shutdown state, rotate the draught fan in the outdoor unit for a time period T2 at an interval T1 to wash a heat exchanger in the outdoor unit;

if the outdoor unit is in operating state, execute routine control to maintain the current operating state of the outdoor unit.

13. The air conditioner according to claim 12, wherein when the air parameter is beyond a preset value, the draught fan is operated at highest operating level for a time period T3 after the abnormal weather stops.

14. The air conditioner according to claim 13, wherein T3=2*T2.

* * * * *